(12) United States Patent
Yang et al.

(10) Patent No.: US 9,477,103 B2
(45) Date of Patent: Oct. 25, 2016

(54) LIQUID CRYSTAL DISPLAY PANEL

(71) Applicants: Xiamen Tianma Micro-Electronics Co., Ltd., Xiamen (CN); Tianma Micro-Electronics Co., Ltd., Shenzhen (CN)

(72) Inventors: Kangpeng Yang, Xiamen (CN); Yuan Li, Xiamen (CN); Zhiwei Zheng, Xiamen (CN)

(73) Assignees: ZIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/223,990

(22) Filed: Mar. 24, 2014

(65) Prior Publication Data

US 2015/0138462 A1    May 21, 2015

(30) Foreign Application Priority Data

Nov. 19, 2013   (CN) .......................... 2013 1 0585898

(51) Int. Cl.
| | |
|---|---|
| G02F 1/133 | (2006.01) |
| G02F 1/13 | (2006.01) |
| G02F 1/1333 | (2006.01) |
| G02F 1/1362 | (2006.01) |

(52) U.S. Cl.
CPC ......... *G02F 1/132* (2013.01); *G02F 1/133382* (2013.01); *G02F 1/136286* (2013.01)

(58) Field of Classification Search
CPC ............. G02F 2001/294; G02F 1/132; G02F 1/13382; G02F 1/136286; H01L 29/4908
USPC ..................................................... 349/21, 111
See application file for complete search history.

(56) References Cited

U.S. PATENT DOCUMENTS

| | | | |
|---|---|---|---|
| 2004/0207588 A1* | 10/2004 | Shiomi | .......................... 345/87 |
| 2005/0073632 A1 | 4/2005 | Dunn et al. | |
| 2005/0083443 A1* | 4/2005 | Lee | ................... G02F 1/133382 349/21 |
| 2005/0286010 A1 | 12/2005 | Park et al. | |
| 2006/0055859 A1 | 3/2006 | Jin et al. | |

(Continued)

FOREIGN PATENT DOCUMENTS

| | | |
|---|---|---|
| CN | 1540401 A | 10/2004 |
| CN | 202362552 U | 8/2012 |

(Continued)

*Primary Examiner* — Nathanael R Briggs
*Assistant Examiner* — William Peterson
(74) *Attorney, Agent, or Firm* — Alston & Bird LLP (57) ABSTRACT

A liquid crystal display panel includes a TFT array substrate, a color filter substrate, and a liquid crystal layer encapsulated between the TFT array substrate and the color filter substrate. The TFT array substrate, the color filter substrate and the liquid crystal layer collectively form a display area, and a margin area surrounding the display area, where the display area includes sub-pixel units surrounded by data lines and scanning lines. Either of the TFT array substrate and the color filter substrate includes heating metal members, and a pair of connection electrodes electrically connected to the plurality of heating metal members, where the heating metal members are formed on an inner side of the TFT array substrate and/or the color filter substrate and are located in the display area, and where the pair of connection electrodes are configured to provide a voltage to the heating metal members.

9 Claims, 8 Drawing Sheets

(56) References Cited

U.S. PATENT DOCUMENTS

2007/0159565 A1 7/2007 Segawa et al.
2011/0157527 A1* 6/2011 Jo et al. ................. 349/106

FOREIGN PATENT DOCUMENTS

| CN | 202362652 U | 8/2012 |
| JP | 08211368 A | 8/1996 |

* cited by examiner

LIQUID CRYSTAL DISPLAY PANEL

CROSS REFERENCE TO RELATED APPLICATIONS

This application claims the benefit of priority to Chinese Patent Application No. 201310585898.9, filed with the Chinese Patent Office on Nov. 19, 2013 and entitled "ELECTRO-STATIC DISCHARGE PROTECTION CIRCUIT AND LIQUID CRYSTAL DISPLAY", the content of which is incorporated herein by reference in its entirety.

TECHNICAL FIELD

The present invention relates to the field of liquid crystal display technologies, in particular to a liquid crystal display panel.

BACKGROUND OF THE INVENTION

Figure 1:
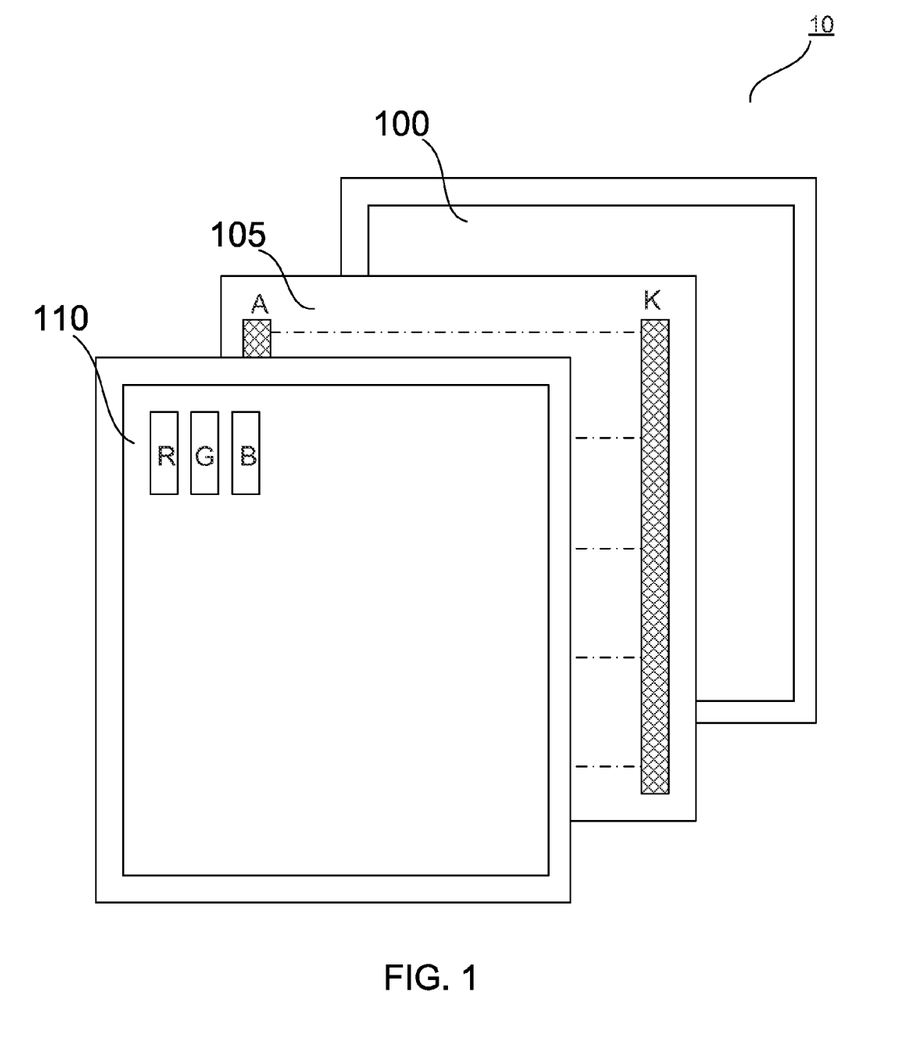
FIG. 1 is a schematic structural view of a liquid crystal display module in the prior art.

FIG. 1 is a schematic structural view of a Liquid Crystal Display Module (LCM) in the prior art. As shown in FIG. 1, a conventional LCM 10 generally includes three main components, i.e. a back light panel 100, a heating plate 105, and a liquid crystal display panel 110. The liquid crystal display panel includes repeatedly arranged sub-pixel units of different colors (for example, repeatedly arranged red, green and blue sub-pixel units). The heating plate 105 includes a pair of heating electrodes denoted by A and K, and the heating plate 105 is generally located between the liquid crystal display panel 110 and the back light panel 100. For the purpose of heating, a voltage is applied across the pair of heating electrodes A and K, and the heat emitted by the heating plate 105 is conducted to the liquid crystal display panel 110, so that the liquid crystals within the liquid crystal display panel 110 are heated. However, the conventional heating plate suffers from the following defects.

1. The heating plate is placed relatively far from the liquid crystals, resulting in a poor heating effect.

2. The heating plate is a device of a certain thickness which is separate from the liquid crystal display panel, so that the height of the LCM is increased due to the heating plate integrated into the LCM, thus adversely affecting the thinning of the LCM.

3. The total weight of the LCM will be increased due to the incorporation of the heating plate which has a certain weight, which is greatly unfavorable to a portable terminal using the LCM.

4. For the production of the separate heating plate 105, a fixed time period shall be taken for manufacturing a heating plate, which is then attached to the LCM and tested in the assembly stage of the LCM, as such, the production of a product with the heating plate 105 takes more time as compared with the production of an LCM without the heating plate 105. From the perspective of time consumption, the LCM with a separate heating device is unfavorable to the control of a product production period.

5. From the perspective of costs, the incorporation of the heating plate 105 causes not only the cost of the heating plate 105, but also a human capital cost for assembling the heating plate 105 and testing the electrical performance of the heating plate 105. Furthermore, the total costs of LCM products are increased because of a defective liquid crystal display panel 110 and a defective back light panel caused by a defective assembly of the heating plate 105.

6. The heating plate 105 is typically made of Indium Tin Oxide (ITO) glass with a low sheet resistance. However, the ITO somewhat blocks light, thus the light emitted from the back light panel 100 is reduced after passing through the glass substrate plated with ITO, as a result, the light produced by the back light panel 100 is not fully utilized in the LCM.

BRIEF SUMMARY OF THE INVENTION

One inventive aspect is a liquid crystal display panel. The display panel includes a TFT array substrate, a color filter substrate, and a liquid crystal layer encapsulated between the TFT array substrate and the color filter substrate. The TFT array substrate, the color filter substrate and the liquid crystal layer collectively form a display area, and a margin area surrounding the display area, where the display area includes a plurality of sub-pixel units surrounded by a plurality of data lines and a plurality of scanning lines. In addition, either of the TFT array substrate and the color filter substrate includes a plurality of heating metal members, and a pair of connection electrodes electrically connected to the plurality of heating metal members, where the heating metal members are formed on an inner side of the TFT array substrate and/or the color filter substrate and are located in the display area, and where the pair of connection electrodes are configured to provide a voltage to the heating metal members.

DETAILED DESCRIPTION OF THE INVENTION

Technical solutions of the present invention will be described below in conjunction with accompanying drawings and with reference to specific embodiments.

Figure 2:
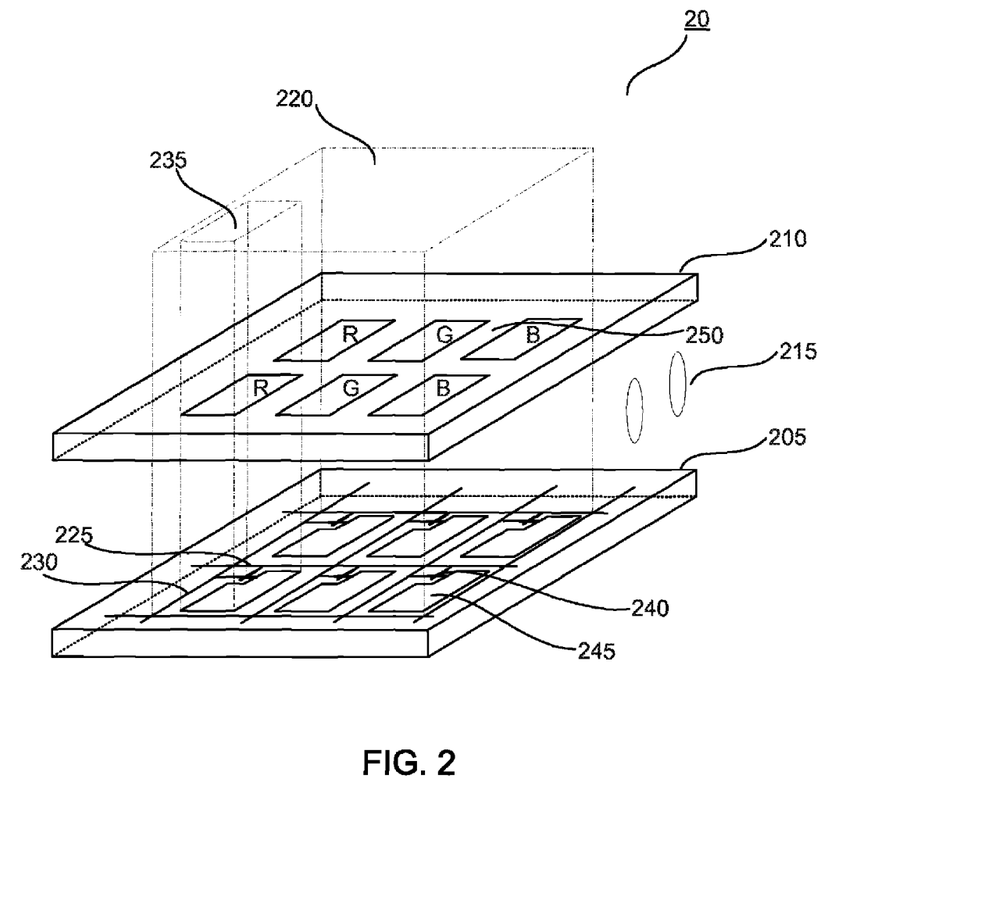
FIG. 2 is a schematic view of a liquid crystal display panel of the present invention.

FIG. 2 is a schematic view of a liquid crystal display panel 20 of the present invention. The liquid crystal display panel 20 includes a TFT array substrate 205, a color filter substrate 210 disposed opposite to the TFT array substrate 205, and a liquid crystal layer 215 encapsulated between the TFT array substrate 205 and the color filter substrate 210. The TFT array substrate 205 includes scanning lines 225 and data lines 230. A TFT switch 240 and a pixel electrode 245 are formed at the intersection of the scanning line 225 and the data line 230. The color filter substrate 210 includes a color resist layer and a black matrix layer 250 surrounding the color resist layer. An area surrounded by two data lines and two scanning lines on the TFT array substrate corresponds to a color resist on the color filter substrate 210 in a light transmitting direction, to form a sub-pixel unit, as indicated by an area 235 as shown by dotted lines in FIG. 2. Each pixel unit is composed of neighboring sub-pixel units of different colors, such as the pixel unit is composed of three sub-pixel units of red (R), green (G) and blue (B) colors as shown in FIG. 2. That is, a plurality of sub-pixel units are surrounded by a plurality of data lines and scanning lines and configured to form a display area 220 (as shown by double dot dash lines in FIG. 2) of the liquid crystal display panel 20. An area of the liquid crystal display panel 20 outside the display area 220 is called a margin area (not shown by any reference number in FIG. 2). The plurality of scanning lines 225 and data lines 230 each extend from the display area 220 to the margin area, so as to be connected to an external data line driving circuit and an external scanning line driving circuit.

It should be noted that, the pixel unit including red (R), green (G) and blue (B) sub-pixel units as shown in the drawings is only illustrative, instead, a pixel unit may be formed by sub-pixel units of another group of colors, for example, sub-pixel units of red (R), green (G), blue (B) and white (W) colors, or sub-pixel units of red (R), green (G), blue (B) and yellow (Y) colors, which are included in the protecting scope of the present invention.

The liquid crystal display panel 20 further includes a plurality of heating metal members (not shown in FIG. 2) which are metals disposed on a certain layer to heat the liquid crystal layer 215. The heating metal members may be formed on the TFT array substrate 205 at its inner side relative to the color filter substrate 210; or the heating metal members may be formed on the color filter substrate 210 at its inner side relative to the TFT array substrate 205; or both the TFT array substrate 205 and the color filter substrate 210 are provided with heating metal members. The above heating metal members fall within the display area 220 in the light transmitting direction.

The liquid crystal display panel 20 further includes a pair of connection electrodes A and K (not shown in FIG. 2) electrically connected to the heating metal members to form an electrical loop, for applying a voltage to the heating metal members. A conducting loop is constituted when the heating metal members are applied by a voltage, so that the heating metal members generate heat.

Next, a solution in which the above heating metal members and the pair of connection electrodes A and K are formed on the TFT array substrate 205 is specifically described in a first embodiment (in conjunction with FIGS. 3A, 3B, 4A-4D, 5A, and 5B); another solution in which the above heating metal members and the pair of connection electrodes A and K are formed on the color filter substrate 210 is specifically described in another embodiment (in conjunction with FIGS. 6A, 6B, 7A-7D, and 8); and yet another solution in which the above heating metal members and the pair of connection electrodes A and K are formed on both the TFT array substrate 205 and the color filter substrate 210 is specifically described in a third embodiment.

First Embodiment

Figure 3A:
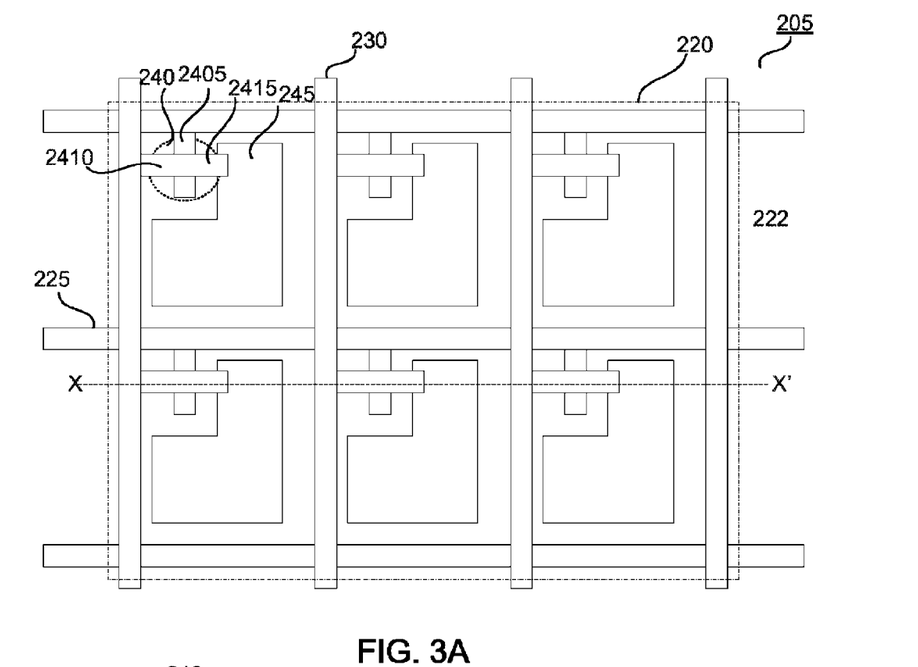
FIG. 3A is a top view of a TFT array substrate shown in FIG. 2.

FIG. 3A is a top view of a TFT array substrate 205 shown in FIG. 2. The TFT array substrate 205 includes a display area 220 and a margin area 222 outside the display area 220. The display area 220 (shown by a box indicated by a dotted line in FIG. 3A) is composed of 6 sub-pixel units surrounded by 3 scanning lines 225 and 4 data lines 230, with the scanning lines 225 and the data lines 230 each extending from the display area 220 to the margin area 222 so as to be connected to an external data line driving circuit and an external scanning line driving circuit. As shown, three sub-pixel units of different colors within the same row constitute a pixel unit, thus two pixel units are shown in FIG. 3A. Each pixel unit includes a TFT switch 240 and a pixel electrode 245. The gate electrode 2405 of the TFT switch 240 is connected to the scanning line 225. The source electrode 2410 of the TFT switch 240 is connected to the data line 230. The drain electrode 2415 of the TFT switch 240 is connected to the pixel electrode 245. It should be noted that, the source electrode and the drain electrode of the TFT switch may be defined differently depending on the direction of a current flow, herein, the electrode connected to the data line is called as the source electrode and the electrode connected to the pixel electrode is called as the drain electrode. However, the present invention is not limited thereto, and the case in which the electrode connected to the data line is called as the drain electrode and the electrode connected to the pixel electrode is called as the source electrode is also within the protecting scope of the present invention.

Figure 3B:
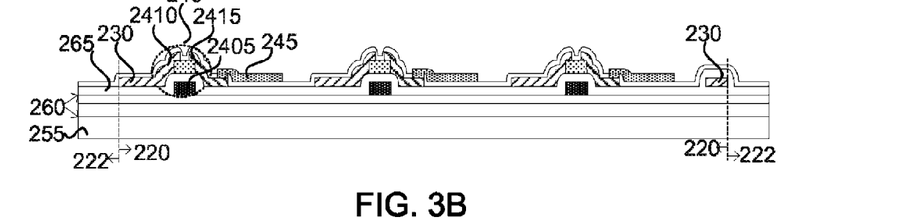
FIG. 3B is a cross-sectional view of the TFT array substrate taken along a line XX' shown in FIG. 3A.

FIG. 3B is a cross-sectional view of the TFT array substrate taken along a line XX' in FIG. 3A. The TFT switches 240 and the pixel electrodes 245, as well as the data lines 230 and the scanning lines (not shown in the cross-sectional view) both surrounding the TFT switches 240 and the pixel electrodes 245, are formed on a glass substrate 255. The insulation between layers is implemented by an insulating layer, such as an insulating layer 265 which insulates the gate electrode 2405 of the TFT switch 240 from the source electrode 2410 and the drain electrode 2415 of the TFT switch 240, as shown in FIG. 3B.

The TFT array substrate 205 further includes two layers denoted by a reference number 260, which represent other layers that may be present in the TFT array substrate 205. Herein, these two layers are illustrative in the drawings.

It should be noted that, the TFT array substrate 205 shown in FIG. 3B has a TFT structure with a bottom gate, which is merely illustrative and does not limit the invention as understood by those skilled in the art. The present invention is also applicable to a TFT structure with a top gate.

The present invention is not limited with respect to the position of the heating metal member, i.e., with respect to the position relation between the heating metal member and the sub-pixel unit in the light transmitting direction, and with respect to which one of the layers shown in the cross-sectional view contains the heating metal member, as long as a layer of metal, which functions to heat the liquid crystal layer 215 without negatively affecting operations of other parts, runs across a certain one of the layers. For example, the heating metal member may be located in a certain layer denoted by a reference number 260 shown in FIG. 3B.

Optionally, if the heating metal member is made of an opaque metal or a metal with a relatively poor light transmittance, the heating metal member shall be designed not to shield the sub-pixel units in the light transmitting direction, in order not to influence the aperture ratio. If the heating metal member is made of a transparent material or has merely an insignificant influence on the aperture ratio, such design is unnecessary.

Likewise, the present invention is not limited with respect to the position of the pair of connection electrodes, i.e., with respect to the position relation between the pair of connection electrodes and the sub-pixel unit in the light transmitting direction, and with respect to which one of the layers shown in the cross-sectional view contains the pair of connection electrodes, as long as a layer of metal, which is configured to apply a voltage to the heating metal member without negatively affecting operations of other parts, runs across a certain one of the layers. For example, the pair of connection electrodes may be located in a certain layer denoted by a reference number 260 shown in FIG. 3B.

Optionally, if the pair of connection electrodes are made of an opaque metal or a metal with a relatively poor light transmittance, the pair of connection electrodes shall be designed not to shield the sub-pixel units in the light transmitting direction, in order not to influence the aperture ratio. If the pair of connection electrodes are made of transparent materials or has merely an insignificant influence on the aperture ratio, such design is unnecessary.

Because both the heating metal member and the pair of connection electrodes are formed in the TFT array substrate in the present invention, the distance between the heating metal member and the liquid crystal layer in the invention is less than the distance between the separate heating metal member and the liquid crystal layer in the prior art, so that a better heating effect is gained and the temperature of the liquid crystal layer can be increased faster with lower power consumption. Additionally, only an additional metal layer (or two metal layers in the case in which the heating metal members and the connection electrodes are not in the same layer) is incorporated to run through the TFT array substrate, causing little influence on the thickness and weight of the LCM and avoiding the manufacture and test for a separate heating plate to shorten the production period of the LCM and save the cost of the LCM.

In a first example of the first embodiment, in order not to influence the aperture ratio, some preferred arrangements of the position relation between the heating metal members and the sub-pixel units in the light transmitting direction are proposed as shown in FIGS. 4A-4D.

Figure 4A:
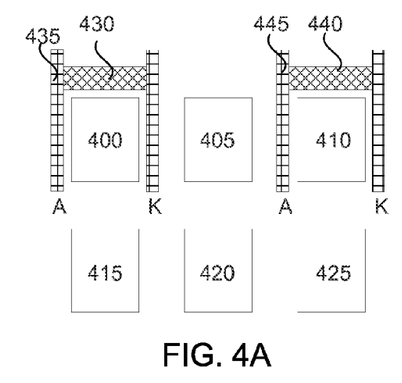
FIGS. 4A-4D are schematic views showing position relations between heating metallic members and sub-pixel units.

Optionally, the heating metal members are disposed on at least one side of at least a portion of the sub-pixel units. For example, for 6 sub-pixel units 400, 405, 410, 415, 420, and 425 shown in FIG. 4A, a heating metal member 430 is disposed on one side of the sub-pixel unit 400, and a heating metal member 440 is disposed on one side of the sub-pixel unit 410. Because the heating metal members 430 and 440 are separated without a connection therebetween, a pair of connection electrodes 435 (including a connection electrode denoted by A and a connection electrode denoted by K) are provided for the heating metal member 430 separately to supply a voltage to the heating metal member 430; besides, a pair of connection electrodes 445 (including a connection electrode denoted by A and a connection electrode denoted by K) are provided for the heating metal member 440 separately to supply a voltage to the heating metal member 440, as shown in FIG. 4A. Apparently, the heating metal member 430 and the heating metal member 440 may share the same pair of connection electrodes, for example, a pair of connection electrodes may be arranged on a layer other than those on which the heating metal member 430 and the heating metal member 440 are located, and connected to both the heating metal members 430 and 440 by vias.

According to the arrangement shown in FIG. 4A, the heating metal members are disposed on at least one side of at least a portion of the sub-pixel units, and such arrangement is suitable for cases with low heating requirements, and makes the wiring layout design for the manufacturing of the heating metal members easier.

Figure 4B:
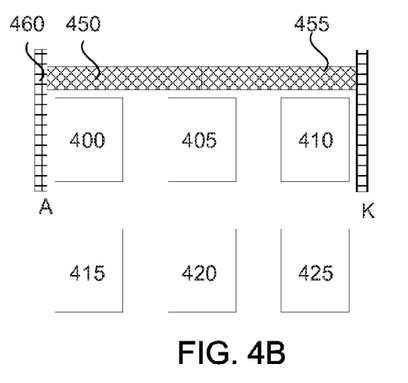
Figure 4C:
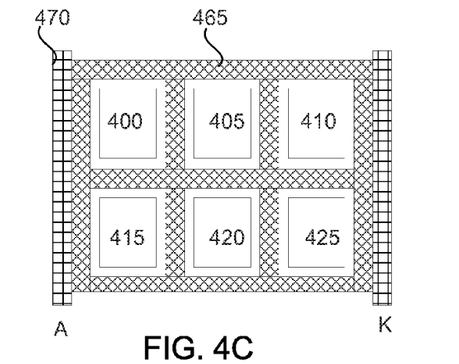

Optionally, neighboring heating metal members are connected together to form a linear or mesh structure. For example, such arrangement of the heating metal members is shown in FIG. 4B. A heating metal member 450 is disposed on one side of a sub-pixel unit 400; besides, a heating metal member 455 is disposed on one side of a sub-pixel unit 410. The heating metal member 450 and the heating metal member 455 are connected together, and share the same pair of connection electrodes 460 (including a connection electrode denoted by A and a connection electrode denoted by K). FIG. 4C shows another arrangement of the heating metal members, where a plurality of heating metal members are connected together to constitute a mesh heating metal member 465. The mesh heating metal member 465 surrounds all the sub-pixel units 400-425, and a pair of connection electrodes 470 (including a connection electrode denoted by A and a connection electrode denoted by K) provides a voltage to the mesh heating metal member 465.

The arrangement shown in FIG. 4B makes neighboring heating metal members be connected together to form a linear structure, while the arrangement shown in FIG. 4B makes neighboring heating metal members be connected together to form a mesh structure. Compared with the arrangement shown in FIG. 4A, the heating efficiency is further increased.

Figure 4D:
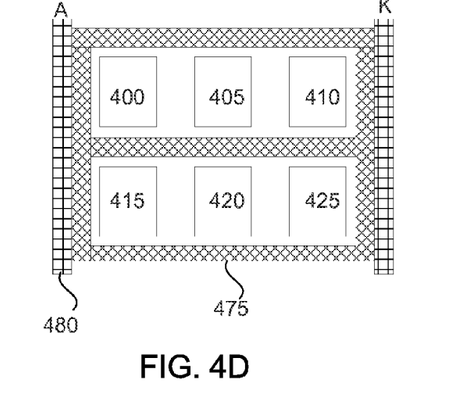

Optionally, the heating metal members are disposed on at least one side of at least a portion or all of the sub-pixel units. For example, as shown in FIG. 4D, if each of neighboring sub-pixel units 400, 405 and 410 represents a different color (for example, the neighboring sub-pixel units 400, 405 and 410 represent R, G, B, respectively), meanwhile each of neighboring sub-pixel units 415, 420 and 425 represents a different color (for example, the neighboring sub-pixel units 415, 420 and 425 represent R, G, B, respectively), then the sub-pixel units 400, 405 and 410 constitute a pixel unit while the sub-pixel units 415, 420 and 425 constitute another pixel unit. A pair of connection electrodes 480 (including a connection electrode denoted by A and a connection electrode denoted by K) are configured to supply a voltage to a heating metal member 475 which surrounds all the pixel unit.

The arrangement shown in FIG. 4D has a higher heating efficiency than that of the arrangement shown in FIG. 4A, and the arrangement shown in FIG. 4D is based on a wiring layout design simpler than that of the arrangements shown in FIGS. 4B and 4C, and thus the arrangement shown in FIG. 4D is more suitable for a case in which both the factors of heating efficiency and simple wiring layout design are considered in combination.

It should be noted that, in the above mentioned examples of the first embodiment of the present invention, some preferred arrangements of the position relation between the heating metal members and the sub-pixel units in the light transmitting direction are proposed. As shown, the present invention is not limited with respect to the position in the display area 220 where the heating metal members are formed, but the heating metal members are preferably designed not to shield the sub-pixel units in the light transmitting direction. Two preferred solutions are proposed in the present invention as below.

In a further example of the first embodiment of the present invention, the heating metal members are located on a layer under the data lines 230 and/or the scanning lines 225, and are covered by the data lines 230 and/or the scanning lines 225 in the light transmitting direction. A beneficial effect obtained by such further example is to utilize the space occupied by the data line and/or scanning line in the light transmitting direction reasonably, without negatively influencing the aperture ratio because no other space is occupied.

In yet a further example of the first embodiment of the present invention, the heating metal member is located below a common electrode contained in the sub-pixel unit, and the common electrode covers the heating metal member in the light transmitting direction.

Figure 5A:
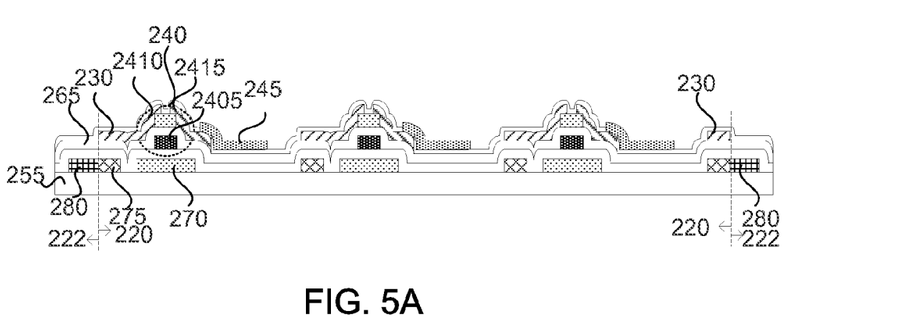
FIGS. 5A and 5B each show a schematic diagram of exemplary position relations between the heating metal members as well as a pair of connection electrodes and a light shielding metal layer.
Figure 5B:
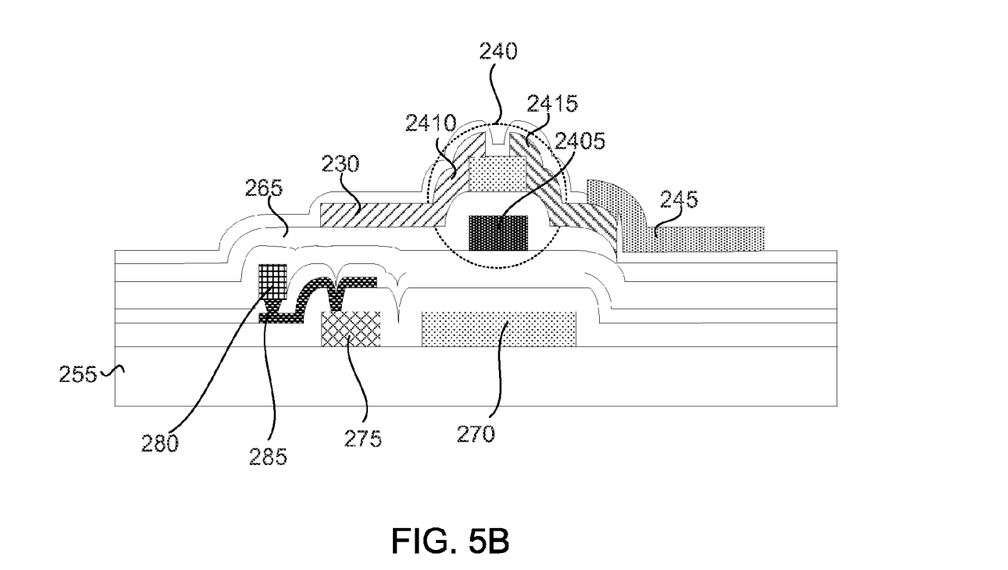

It should be noted that, in the above mentioned examples of the first embodiment of the present invention, the present invention is not limited with respect to which one of the layers shown in the cross-sectional view contains the heating metal members and the pair of connection electrodes. Next, embodiments of the present invention with preferred layers containing the heating metal members and the pair of connection electrodes will be given in combination with FIGS. 5A and 5B. FIGS. 5A and 5B each show an exemplary position relation between heating metal members as well as a pair of connection electrodes and the light shielding metal layer. It should be noted that, components shown in FIGS. 5A and 5B that are identical with those shown in FIGS. 2 and 3 are represented by the same reference numbers.

In yet another example of the first embodiment of the present invention, as shown in FIG. 5A, the sub-pixel unit further includes a light shielding metal member 270 disposed on a side of the TFT array substrate 205, and the light shielding metal member 270 is located on a layer under the TFT switch 240 and corresponds to the TFT switch 240 in the light transmitting direction, to shield and prevent light from entering the TFT switch 240 to avoid the influence on the performance of the TFT switch 240 in case the light enters into the TFT switch 240.

In the example, the heating metal member may be formed on a layer different from a layer on which the light shielding metal member 270 is formed, that is, the wiring for the heating metal member and the light shielding metal member 270 is disposed separately. Or, the heating metal member, such as the heating metal member 275 shown in FIG. 5A, and the light shielding metal member 270 may be both formed on the same layer.

Optionally, the heating metal member and the light shielding metal member 270 are formed on the same layer. From the perspective of manufacture techniques, for example, a metal layer is deposited on a glass substrate 255 and then is patterned to form the light shielding metal member 270 and the heating metal member 275.

The heating metal member 275 share the same metal layer as the light shielding metal member 270 of an existing common TFT product, so that the heating metal member may be formed concurrently when the light shielding metal member 270 is manufactured, therefore, there is neither any influence on the manufacture period of the TFT array substrate 205, nor any influence on the subsequent assembly of the LCM.

In yet another example of the first embodiment of the present invention, the pair of connection electrodes A and K and the heating metal members, such as the pair of connection electrodes A and K 280 and the heating metal members 275 shown in FIG. 5A, may be formed on the same layer, or may be formed on different layers through separate wiring, as shown in FIG. 5B.

As shown in FIG. 5A, the pair of connection electrodes A and K 280 and the heating metal members 275 are formed on the same layer. From the perspective of manufacture techniques, for example, a metal layer is deposited on a glass substrate 255 and then patterned to form the pair of connection electrodes A and K 280 and the heating metal members 275.

As shown in FIG. 5B, the pair of connection electrodes A and K 280 and the heating metal members 275 are formed on different layers. From the perspective of manufacture techniques, the pair of connection electrodes A and K 280 and the heating metal members 275 may be connected by vias 285. These techniques are well known to those skilled in this art, and therefore are not repeatedly described here.

In the example, in the presence of the light shielding metal members 270, both the pair of connection electrodes A and K 280 and the heating metal members 275 may be formed on the same layer as the light shielding metal members 270, as shown in FIG. 5A. From the perspective of manufacture techniques, for example, a metal layer is deposited on the glass substrate 255 and then is patterned to form the light shielding metal members 270, the heating metal members 275 and the pair of connection electrodes 280.

The heating metal members 275 and the pair of connection electrodes 280 may share the same metal layer as the light shielding metal members 270 of an existing common TFT product, so that the heating metal member and the pair of connection electrodes may be manufactured at the same time as the light shielding metal member 270, therefore, there is neither any influence on the manufacture period of the TFT array substrate 205, nor any influence on the subsequent assembly of the LCM.

In yet another example of the first embodiment of the present invention, the pair of connection electrodes are electrically connected to an external driving circuit, through which the pair of connection electrodes is supplied by an external power supply. From the perspective of manufacture techniques, the pair of connection electrodes A and K are directed to a TFT stage of the margin area 222 and finally directed to the external driving circuit.

The first embodiment in which the heating metal members and the pair of connection electrodes A and K are formed on the TFT array substrate 205 has been described above in combination with FIGS. 3A, 3B, 4A-4D, 5A, and 5B. In the first embodiment, by disposing the heating metal members within a liquid crystal cell, more specifically, by forming the heating metal members on the inner side of the TFT array substrate, the distance between the heating plate and the liquid crystals is reduced, so that the heating effect is improved by raising the temperature of the liquid crystal layer fast with low power consumption. Meanwhile, the LCM is thinned, the total weight of the LCM is reduced, the production period of the LCM is shortened, and the production cost of the LCM is saved. Furthermore, with the preferred approaches of the present invention, the LCM can make full use of light produced by the back light panel.

Additionally, after reading the above descriptions, those skilled in this art will readily understand that technical solutions in the above various examples may be combined with each other without departing from the concept of the present invention, and these combinations are within the protecting scope of the present invention.

Second Embodiment

Figure 6A:
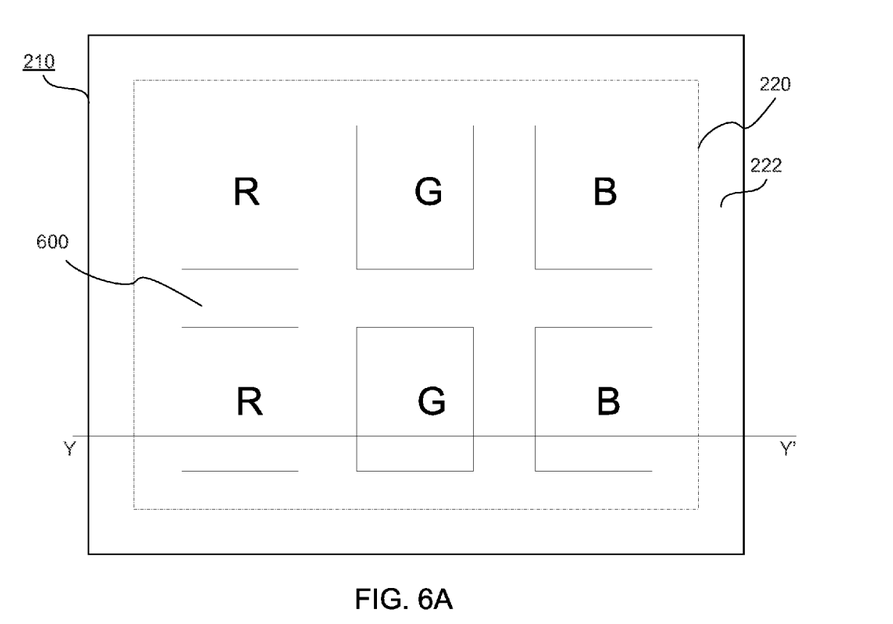
FIG. 6A is a top view of a color filter substrate shown in FIG. 2.

FIG. 6A is a top view of a color filter substrate 210 shown in FIG. 2, wherein the color filter substrate 210 includes a display area 220 and a margin area 222 outside the display area 220. The display area 220 includes 6 sub-pixel units (indicated by R, G, and B in FIG. 6) and a black matrix layer surrounding a color resist layer. In FIG. 6, three sub-pixel units of different colors in the same row constitute a pixel unit, therefore, two pixel units are shown in Figures.

Figure 6B:
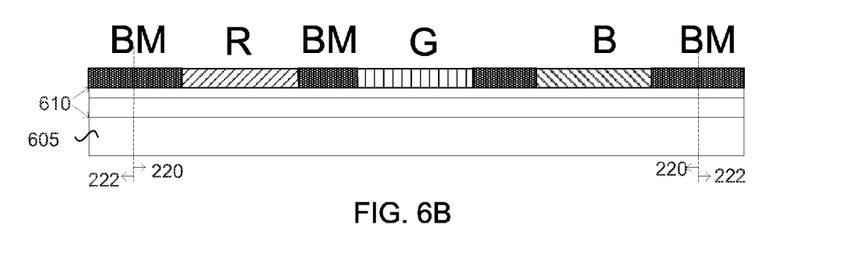
FIG. 6B is a cross-sectional view of the color filter substrate taken along a line YY' shown in FIG. 6A.

FIG. 6B is a cross-sectional view of the color filter substrate taken along a line YY' in FIG. 6A. The black matrix layer (BM) and the color resist layer (R/G/B) are formed on the glass substrate 605.

The color filter substrate further includes two layers, which are denoted by the same reference number 610, representing other layers that may exist in the color filter substrate 210. These two layers are illustrative.

The present invention is not limited with respect to the position of the heating metal member, i.e., with respect to the position relation between the heating metal member and the sub-pixel unit (which means the color resist layer on one side of the color filter substrate) in the light transmitting direction, and with respect to which one of the layers shown in the cross-sectional view contains the heating metal member, as long as a layer of metal, which functions to heat the liquid crystal layer 215 without negatively affecting operations of other parts, runs across a certain one of the layers. For example, the heating metal member may be located in a certain layer denoted by a reference number 610 shown in FIG. 6B.

Optionally, if the heating metal member is made of an opaque metal or a metal with a relatively poor light transmittance, the heating metal member shall be designed not to shield the color resist layer in the light transmitting direction, in order not to influence the aperture ratio. If the heating metal member is made of a transparent material or has merely an insignificant influence on the aperture ratio, such design is unnecessary.

Likewise, the present invention is not limited with respect to the position of the pair of connection electrodes, i.e., with respect to the position relation between the pair of connection electrodes and the color resist layer in the light transmitting direction, and with respect to which one of the layers shown in the cross-sectional view contains the pair of connection electrodes, as long as a layer of metal, which is configured to apply a voltage to the heating metal member without negatively affecting operations of other parts, runs across a certain one of the layers. For example, the pair of connection electrodes may be located in a certain layer denoted by a reference number 610 shown in FIG. 6B.

Optionally, if the pair of connection electrodes are made of an opaque metal or a metal with a relatively poor light transmittance, the pair of connection electrodes shall be designed not to shield the color resist layer in the light transmitting direction, in order not to influence the aperture ratio. If the pair of connection electrodes are made of transparent materials or has merely an insignificant influence on the aperture ratio, such design is unnecessary.

Because both the heating metal member and the pair of connection electrodes are formed in the color filter substrate in the present invention, the distance between the heating metal member and the liquid crystal layer in the invention is less than the distance between the separate heating metal member and the liquid crystal layer in the prior art, so that a better heating effect is gained and the temperature of the liquid crystal layer can be increased faster with lower power consumption. Additionally, only an additional metal layer (or two metal layers in the case in which the heating metal members and the connection electrodes are not in the same layer) is incorporated into the color filter substrate, causing little influence on the thickness and weight of the LCM and avoiding the manufacture and test for a separate heating plate to shorten the production period of the LCM and save the cost of the LCM.

In a second example of the first embodiment, in order not to influence the aperture ratio, some preferred arrangements of the position relation between the heating metal members and the sub-pixel units (which is the color resist layer) in the light transmitting direction are proposed as shown in FIGS. 7A-7D.

Figure 7A:
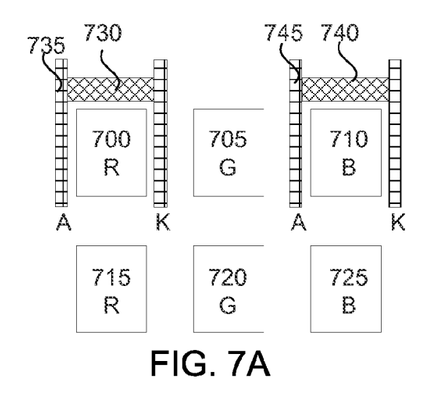
FIGS. 7A-7D are schematic views of position relations between the heating metal members and the sub-pixel units.

Optionally, the heating metal members are disposed on at least one side of at least a portion of the sub-pixel units. For example, for 6 sub-pixel units 700, 705, 710, 715, 720, and 725 shown in FIG. 7A, a heating metal member 730 is disposed on one side of the sub-pixel unit 700, and a heating metal member 740 is disposed on one side of the sub-pixel unit 710. Because the heating metal members 730 and 740 are separated without a connection therebetween, a pair of connection electrodes 735 (including a connection electrode denoted by A and a connection electrode denoted by K) are provided for the heating metal member 730 separately to supply a voltage to the heating metal member 730; besides, a pair of connection electrodes 745 (including a connection electrode denoted by A and a connection electrode denoted by K) are provided for the heating metal member 740 separately to supply a voltage to the heating metal member 740, as shown in FIG. 7A. Apparently, the heating metal member 730 and the heating metal member 740 may share the same pair of connection electrodes, for example, a pair of connection electrodes may be arranged on a layer other than those on which the heating metal member 730 and the heating metal member 740 are located, and connected to both the heating metal members 730 and 740 by vias.

According to the arrangement shown in FIG. 7A, the heating metal members are disposed on at least one side of at least a portion of the sub-pixel units, and such arrangement is suitable for cases with low heating requirements, and makes the wiring layout design for the manufacturing of the heating metal members easier.

Figure 7B:
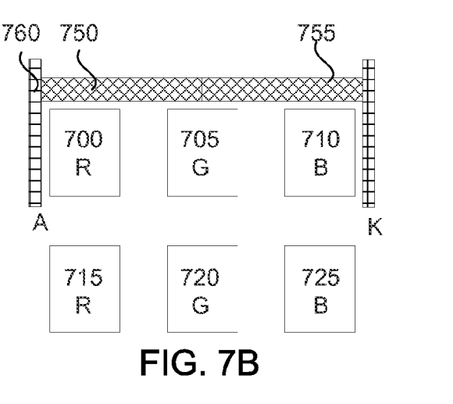
Figure 7C:
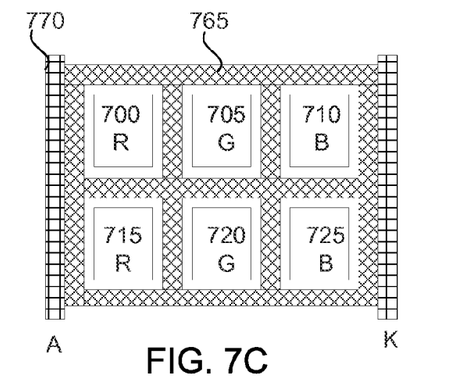

Optionally, neighboring heating metal members are connected together to form a linear or mesh structure. For example, such arrangement of the heating metal members is shown in FIG. 7B. A heating metal member 750 is disposed on one side of a sub-pixel unit 700; besides, a heating metal member 755 is disposed on one side of a sub-pixel unit 710. The heating metal member 750 and the heating metal member 755 are connected together, and share the same pair of connection electrodes 760 (including a connection electrode denoted by A and a connection electrode denoted by K). FIG. 7C shows another arrangement of the heating metal members, where a plurality of heating metal members are connected together to constitute a mesh heating metal member 765. The mesh heating metal member 765 surrounds all the sub-pixel units 700-725, and a pair of connection electrodes 770 (including a connection electrode denoted by A and a connection electrode denoted by K) provides a voltage to the mesh heating metal member 765.

The arrangement shown in FIG. 7B makes neighboring heating metal members be connected together to form a linear structure, while the arrangement shown in FIG. 7B makes neighboring heating metal members be connected together to form a mesh structure. Compared with the arrangement shown in FIG. 7A, the heating efficiency is further increased.

Figure 7D:
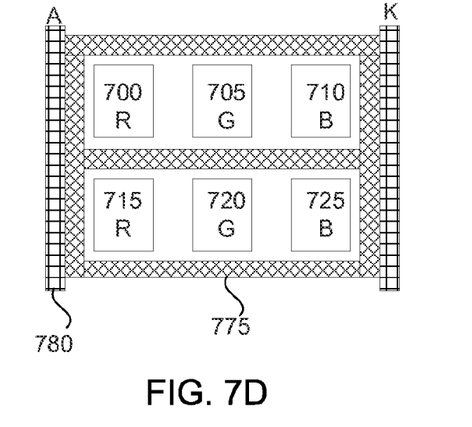

Optionally, the heating metal members are disposed on at least one side of at least a portion or all of the sub-pixel units. For example, as shown in FIG. 7D, if each of neighboring sub-pixel units 700, 705 and 710 represents a different color (for example, the neighboring sub-pixel units 700, 705 and 710 represent R, G, B, respectively), meanwhile each of neighboring sub-pixel units 715, 720 and 725 represents a different color (for example, the neighboring sub-pixel units 715, 720 and 725 represent R, G, B, respectively), then the sub-pixel units 700, 705 and 710 constitute a pixel unit while the sub-pixel units 715, 720 and 725 constitute another pixel unit. A pair of connection electrodes 780 (including a connection electrode denoted by A and a connection electrode denoted by K) are configured to supply a voltage to a heating metal member 775 which surrounds all the pixel unit.

The arrangement shown in FIG. 7D has a higher heating efficiency than that of the arrangement shown in FIG. 7A, and is based on a wiring layout design simpler than that of the arrangements shown in FIGS. 7B and 7C, and thus is more suitable for a case in which both the factors of heating efficiency and simple wiring layout design are considered in combination.

It should be noted that, in the above mentioned examples of the second embodiment of the present invention, some preferred arrangements of the position relation between the heating metal members and the sub-pixel units in the light transmitting direction are proposed. As shown, the present invention is not limited with respect to the position in the display area 220 where the heating metal members are formed, but the heating metal members are preferably designed not to shield the sub-pixel units in the light transmitting direction. Two preferred solutions are proposed in the present invention as below.

Figure 8:
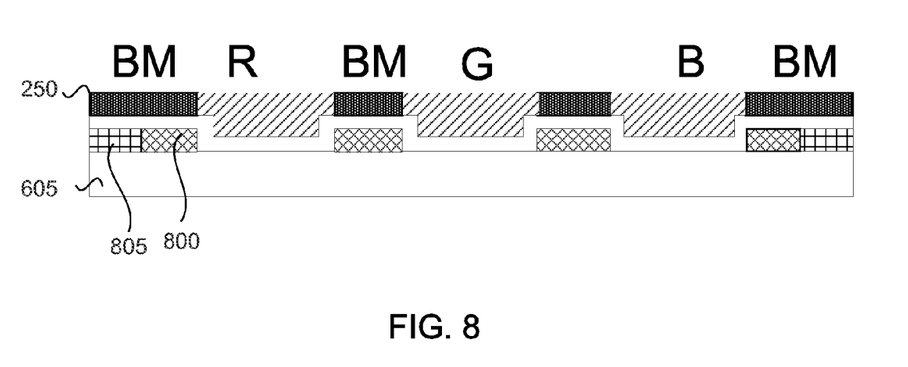
FIG. 8 is a schematic diagram showing an exemplary position relation between the heating metal members as well as a pair of connection electrodes and a black matrix layer.

In another example of the second embodiment of the present invention, the heating metal member is located on a layer under the opaque black matrix layer which covers the heating metal member in a light transmitting direction. FIG. 8 show an exemplary position relation between the heating metal members and a black matrix layer. A beneficial effect obtained by such further example is to utilize the space occupied by the data line and/or scanning line in the light transmitting direction reasonably, without negatively influencing the aperture ratio because no other space is occupied.

It should be noted that, identical components shown in FIGS. 2 and 6 and FIG. 8 are represented by the same reference numbers.

Additionally, it should be noted that, in the above mentioned examples of the second embodiment of the present invention, there is no limitation with respect to the position relations between the pair of connection electrodes A and K and the heating metal members. FIG. 8 show an exemplary position relation between the heating metal members and a black matrix layer. A heating metal member 800 and a pair of connection electrodes A and K 805 shown in FIG. 8 may be formed on different layers, that is, their wires are disposed separately.

As shown in FIG. 8, the pair of connection electrodes A and K 805 and the heating metal members 800 are formed on the same layer. From the perspective of manufacture techniques, for example, a metal layer is deposited on a glass substrate 255 and then patterned to form the pair of connection electrodes A and K 805 and the heating metal members 800.

In yet another example of the second embodiment of the present invention, the pair of connection electrodes are electrically connected to an external driving circuit, through which the pair of connection electrodes is supplied by an external power supply. From the perspective of manufacture techniques, the pair of connection electrodes A and K are directed to the margin area 222 and finally directed to the external driving circuit.

The second embodiment in which the heating metal members and the pair of connection electrodes A and K are formed on the color filter substrate 210 has been described above in combination with FIGS. 6A, 6B, 7A-7D, and 8. In the second embodiment, by disposing the heating metal members within a liquid crystal cell, more specifically, by forming the heating metal members on the inner side of the color filter substrate, the distance between the heating member and the liquid crystals is reduced, so that the heating effect is improved by raising the temperature of the liquid crystal layer fast with low power consumption. Meanwhile, the LCM is thinned, the total weight of the LCM is reduced, the production period of the LCM is shortened, and the production cost of the LCM is saved. Furthermore, with the preferred approaches of the present invention, the LCM can make full use of light produced by the back light panel.

Additionally, after reading the above descriptions, those skilled in this art will readily understand that technical solutions in the above various examples may be combined with each other without departing from the concept of the present invention, and these combinations are within the protecting scope of the present invention.

Third Embodiment

In the third embodiment of the present invention, both the TFT array substrate 205 and the color filter substrate 210 are provided with the heating metal members and the pairs of connection electrodes A and K, that is, the third embodiment is a combination of the first embodiment and the second embodiment, therefore, examples on the side of the side of the TFT array substrate involved in the embodiment and examples on the side of the color filter substrate involved in the second embodiment are applicable to the third embodiment, therefore, the third embodiment has the beneficial effects presented by both the first embodiment and the second embodiment.

The above descriptions are only used as preferred embodiments of the present invention but not to limit the present invention thereto, and various modifications and changes may be made to the present invention to those skilled in this art. All modifications, equivalences, and improvements etc. within the spirit and principle of the present invention should be included in the protecting scope of the present invention.

What is claimed is:

1. A liquid crystal display panel, comprising:
a TFT array formed on a glass substrate;
a color filter substrate over the glass substrate; and
a liquid crystal layer encapsulated between the TFT array and the color filter substrate,
wherein the TFT array, the color filter substrate and the liquid crystal layer collectively form:
a display area, and
a margin area surrounding the display area, wherein the display area comprises a plurality of sub-pixel units surrounded by a plurality of data lines and a plurality of scanning lines;
wherein either of the TFT array and the color filter substrate comprises:
a plurality of heating metal members, and
a pair of connection electrodes electrically connected to the plurality of heating metal members, wherein the heating metal members are formed on an inner side of the TFT array substrate and/or the color filter substrate and are located in the display area, wherein the inner side of the TFT array is relative to the color filter substrate and the inner side of the color filter is relative to the TFT array substrate, and wherein the pair of connection electrodes are configured to provide a voltage to the heating metal members, wherein, the heating metal members are disposed on at least one side of at least a portion of the sub-pixel units without shielding the sub-pixel units, wherein each sub-pixel unit comprises a TFT switch, a pixel electrode and a light shielding metal member, wherein the light shielding metal member is disposed on a layer under the gate electrode of the TFT switch, and wherein the heating metal members and the light shielding metal member are formed on the same layer.

2. The liquid crystal display panel of claim 1, wherein the color filter substrate comprises a black matrix layer which covers the heating metal members in a light transmitting direction.

3. The liquid crystal display panel of claim 1, wherein the heating metal members are located on a layer under data lines and/or scanning lines which cover the heating metal members in a light transmitting direction.

4. The liquid crystal display panel of claim 1, wherein the sub-pixel unit further comprises a common electrode, the heating metal members are located under the common electrode, and the common electrode shields the heating metal members in a light transmitting direction.

5. The liquid crystal display panel of claim 1, wherein neighboring heating metal members are connected together to form a linear or mesh structure.

6. The liquid crystal display panel of claim 1, wherein a plurality of neighboring sub-pixels of different colors constitute a pixel unit, and wherein the heating metal members are disposed on at least one side of a portion or all of the pixel units.

7. The liquid crystal display panel of claim 1, wherein the pair of connection electrodes are formed on the same layer as the heating metal members.

8. The liquid crystal display panel of claim 1, wherein the pair of connection electrodes are located on a layer different from that on which the heating metal members are located, and the pair of connection electrodes are electrically connected with the heating metal members by vias.

9. The liquid crystal display panel of claim 1, wherein the pair of connection electrodes are electrically connected to an external driving circuit.

* * * * *